United States Patent
Rangel et al.

(10) Patent No.: US 10,348,585 B2
(45) Date of Patent: Jul. 9, 2019

(54) POWER EFFICIENT CONTROL AND OPERATION OF A DATA-SENSING PERIPHERAL DEVICE BASED ON LOCATION AND MODE OF TRANSPORT

(71) Applicant: Drayson Technologies (Europe) Limited, Kidlington, Oxfordshire (GB)

(72) Inventors: Manuel Pinuela Rangel, London (GB); Diana Stefan, London (GB); Bruno Roberto Franciscatto, London (GB)

(73) Assignee: Drayson Technologies (Europe) Limited (GB)

( * ) Notice: Subject to any disclaimer, the term of this patent is extended or adjusted under 35 U.S.C. 154(b) by 612 days.

(21) Appl. No.: 14/821,487

(22) Filed: Aug. 7, 2015

(65) Prior Publication Data

US 2017/0041205 A1    Feb. 9, 2017

(51) Int. Cl.
| | | |
|---|---|---|
| *G06F 13/10* | (2006.01) | |
| *G06F 13/38* | (2006.01) | |
| *H04L 12/26* | (2006.01) | |
| *G06Q 10/00* | (2012.01) | |
| *G06F 13/40* | (2006.01) | |
| *H04L 12/24* | (2006.01) | |

(52) U.S. Cl.
CPC .......... *H04L 43/065* (2013.01); *G06F 13/102* (2013.01); *G06F 13/385* (2013.01); *G06F 13/4022* (2013.01); *G06Q 10/00* (2013.01); *H04L 41/0853* (2013.01); *H04L 43/024* (2013.01); *Y02D 10/14* (2018.01); *Y02D 10/151* (2018.01)

(58) Field of Classification Search
CPC ..... H04L 43/065; G06F 13/102; G06F 13/385
USPC ........................................................... 710/14
See application file for complete search history.

(56) References Cited

U.S. PATENT DOCUMENTS

| | | | | |
|---|---|---|---|---|
| 5,453,939 | A * | 9/1995 | Hoffman | B60K 35/00 340/438 |
| 9,813,897 | B2 * | 11/2017 | Manente | H04W 8/22 |
| 2001/0011224 | A1 | 8/2001 | Brown | |
| 2004/0103139 | A1 | 5/2004 | Hubbard et al. | |

(Continued)

OTHER PUBLICATIONS

PCT International Search Report and Written Opinion, PCT Application No. PCT/IB2016/001264, dated Apr. 7, 2017, 19 pages.

(Continued)

*Primary Examiner* — Christopher B Shin
(74) *Attorney, Agent, or Firm* — Fenwick & West LLP

(57) ABSTRACT

A peripheral device capable of being worn, carried by a user, or used in an in-vehicle computer system operates in conjunction with an application to acquire, store, and present data relevant to a user's health, physical activity, environment, air quality, or other parameters of interest. For power efficient operation and enhanced performance, control parameters of the peripheral device such as duty cycle, sampling rate, and sleep state may be wirelessly and automatically controlled by the mobile device. Furthermore, the mobile application can provide a wireless energy signal to the peripheral device to recharge the battery of the peripheral device. The control parameters may be automatically controlled by the mobile application dependent on the user's location, activity, mode of transportation or other parameters without intervention from a user.

20 Claims, 14 Drawing Sheets

(56) References Cited

U.S. PATENT DOCUMENTS

| | | | | |
|---|---|---|---|---|
| 2009/0303199 | A1* | 12/2009 | Cho | G06F 3/04845 345/173 |
| 2011/0076003 | A1* | 3/2011 | Cho | G03B 17/20 396/297 |
| 2012/0086564 | A1* | 4/2012 | Sinha | H04M 1/23 340/407.1 |
| 2012/0221317 | A1* | 8/2012 | Hwang | H04M 1/24 703/23 |
| 2013/0300356 | A1* | 11/2013 | Yang | H02J 7/0047 320/108 |
| 2013/0346517 | A1* | 12/2013 | Trent | H04L 67/24 709/206 |
| 2014/0094198 | A1* | 4/2014 | Heo | H04W 52/0274 455/456.4 |
| 2014/0180595 | A1* | 6/2014 | Brumback | A61B 5/0015 702/19 |
| 2014/0274147 | A1* | 9/2014 | Kennedy | H04W 64/00 455/456.3 |
| 2014/0282192 | A1* | 9/2014 | Grossman | G06F 3/0484 715/771 |
| 2014/0335490 | A1 | 11/2014 | Baarman et al. | |
| 2014/0350883 | A1* | 11/2014 | Carter | A61B 5/6802 702/141 |
| 2015/0020614 | A1 | 1/2015 | Gettings et al. | |
| 2015/0102764 | A1* | 4/2015 | Leabman | H02J 7/025 320/107 |
| 2015/0134430 | A1* | 5/2015 | Ellis | G06Q 30/0241 705/14.4 |
| 2015/0195694 | A1* | 7/2015 | Vedhanarayanan | H04W 4/22 455/404.1 |
| 2015/0201065 | A1* | 7/2015 | Shim | H04M 1/72569 455/556.1 |
| 2015/0277720 | A1* | 10/2015 | Thorson | G06F 3/04847 345/174 |
| 2015/0348009 | A1* | 12/2015 | Brown | G06Q 20/3227 705/16 |
| 2015/0370531 | A1* | 12/2015 | Faaborg | G06F 3/167 704/275 |
| 2016/0019283 | A1* | 1/2016 | Gibson | G06F 17/30598 707/610 |
| 2016/0048161 | A1* | 2/2016 | Carceroni | G06F 1/163 361/679.03 |
| 2016/0291703 | A1* | 10/2016 | Tokutake | G06F 1/163 |
| 2016/0358451 | A1* | 12/2016 | Adler | G08B 21/24 |
| 2016/0379205 | A1* | 12/2016 | Margadoudakis | G06Q 20/327 705/71 |
| 2016/0380464 | A1* | 12/2016 | Chin | H02J 7/025 320/108 |

OTHER PUBLICATIONS

Galeev, M., "A Primer on Bluetooth Low Energy (Part 1)," EE Times-India | eetindia, Aug. 8, 2011, pp. 1-3, [Online] [Retrieved on May 20, 2014] Retrieved from the Internet<URL:http://www.eetindia.co.in/STATIC/PDF/201108/EEIOL_2011AUG08_RFD_TA_01.pdf?SOURCES=DOWNLOAD>.

PCT Invitation to Pay Additional Fees, PCT Application No. PCT/IB2016/001264, dated Dec. 16, 2016, 8 pages.

Anonymous: "Wearable Technology—Wikipedia," Aug. 6, 2015, 4 pages, [Online] [Retrieved on Nov. 8, 2016] Retrieved from the Internet<URL:https://en.wikipedia.org/w/index.php?title=Wearable_technology&oldid=674819489>.

Wilson, R., "Energy-Efficient Wireless Protocols for Wearables," Electronics Weekly.com, Aug. 8, 2014, 7 pages, [Online] [Retrieved on Nov. 8, 2016] Retrieved from the Internet<URL:http://www.electronicsweekly.com/market-sectors/embedded-systems/energy-efficient-wireless-protocols-wearables-2014-08/>.

Dham, R. et al. "Bluetooth Low Energy Brings Power-Efficient Communications to Wearables—Embedded Computing Design," Mar. 1, 2015, 6 pages, [Online] [Retrieved on Nov. 8, 2016] Retrieved from the Internet<URL:http://embedded-computing.com/articles/bluetooth-brings-power-efficient-communications-wearables/>.

* cited by examiner

Mode of Transport

| | Static | Walk/Run | Bike | Bus | Car | Train |
|---|---|---|---|---|---|---|
| Indoor | Low | Low | Low | N/A | N/A | N/A |
| Outdoor Typical | Medium | Medium | Medium | High | High | Medium |
| Outdoor City Center | Medium | High | High | Medium | Medium | Medium |

Location

FIG. 12

Base Sampling Rate

| CO Level | | Low Sampling Rate | Medium Sampling Rate | High Sampling Rate |
|---|---|---|---|---|
| | High CO (critical data) | Increase Sampling Rate | Increase Sampling Rate | No Change |
| | Medium CO | Increase Sampling Rate if Previously Low, Otherwise, No Change | No Change | Decrease Sampling Rate if Previously High, Otherwise No Change |
| | Low CO (non-critical data) | No Change | Decrease Sampling Rate | Decrease Sampling Rate |

FIG. 13

POWER EFFICIENT CONTROL AND OPERATION OF A DATA-SENSING PERIPHERAL DEVICE BASED ON LOCATION AND MODE OF TRANSPORT

BACKGROUND

This invention relates generally to, a peripheral device, and more particularly to automatically controlling operating parameters of a peripheral device to optimize performance and power efficiency.

Wearable or user-carried electronic peripheral devices have become increasingly prevalent as technological advances enable such devices to be produced at low cost and achieve high performance for a variety of functions. Such devices may include various sensors to collect information about the environment and communicate the sensed data to a mobile phone or other mobile device for presenting to a user. In order to optimize the usability of such devices, it is desirable for them to operate in a power efficient manner that enables the devices to operate for long periods of time.

SUMMARY

A processing apparatus comprises a processor and a non-transitory computer readable storage medium storing instructions for controlling a peripheral device. The processing device determines location information indicating a location of a user carrying the peripheral device and determines mode of transport information indicating a mode of transport being used by the user carrying the peripheral device. Determining the mode of transport information may comprise, for example, selecting between a static mode, an on foot mode, a bike mode, a bus mode, a car mode, and a train mode. The processing device controls a data collection parameter of the peripheral device based on the location information and the mode of transport information. The processing device receives from the peripheral device, sensor data obtained by the peripheral device according to the data collection parameter and generates an output representing the sensor data. The sensor data may comprise, for example, a carbon monoxide level and/or an ambient temperature.

In an embodiment, controlling the data collection parameter of the peripheral device comprises controlling at least one of: a sampling rate at which the peripheral device senses data and a duty cycle at which the peripheral device switches between an active state in which the peripheral device actively collects data according to the sampling rate and a dormant state in which the peripheral device does not actively collect data.

In an embodiment in which the data collection parameter comprises a sampling rate, the data collection parameter may be controlled based on the following process. The processing device determines if a change occurs to the mode of transport, the location, or a journey status (e.g., if an existing journey ends or if a new journey starts). Responsive to the change occurring, a lookup in a lookup table is performed to determine a base sampling rate indexed to the mode of transport and the location in the lookup table. In response to no change occurring, the base sampling rate is left unchanged at its current sampling rate. The base sampling rate may be adjusted up to an adjusted sampling rate responsive to the received sensor data indicating that an air quality measure meets first criteria and the base sampling rate may be adjusted down to the adjusted sampling rate responsive to the received sensor data indicating that the air quality measure meets second criteria different than the first criteria. The data collection parameter is then set according to the adjusted sampling rate. In another embodiment, the adjusted sampling rate may be decreased responsive to receiving an indication that the peripheral battery level is below a predefined threshold.

In an embodiment, the data collection parameter may further be set based on other factors. For example, in one embodiment, the current operating state of the peripheral device is determined, and the data collection parameter of the peripheral device is further controlled based on the current operating state. In another embodiment, sensor data collected by the peripheral device is received and the data collection parameter of the peripheral device is further controlled based on the sensor data. In yet another embodiment, the location information indicates whether the user carrying the peripheral device is in an indoor environment, a typical outdoor environment, or a city center outdoor environment, and the data collection parameter of the peripheral device is further controlled based on whether the user carrying the peripheral device is in the indoor environment, the typical outdoor environment, or the city center outdoor environment.

In another embodiment, the processing device further controls an advertising rate of the peripheral device based on the location information and the mode of transport information. Here, the advertising rate specifies how frequently the peripheral device attempts connections to the processing device to transfer the sensor data to the processing device and to receive the data collection parameter from the processing device.

In yet another embodiment, the processing device further determines whether or not to provide a wireless RF energy signal to the peripheral device. For example, in one embodiment, the processing device determines if a battery state of the peripheral device is below a first threshold power level and determines if a battery state of the processing device is above a second threshold power level. An RF energy module of the processing device is activated to output a wireless charging signal to the peripheral device responsive to the battery state of the peripheral device being below the first threshold power level and the battery state of the processing device being above the second threshold power level. The wireless charging signal wirelessly charges a battery of the peripheral device.

Furthermore, a control parameter for an RF energy module of the processing device may be determined based on the location information and the mode of transport. The processing device then controls the RF energy module to activate a wireless charging signal to the peripheral device dependent on the control parameter in order to wirelessly charge the battery of the peripheral device.

In another embodiment, the processing device controls an actuator of the peripheral device based on the location information and the mode of transport information.

In another embodiment, a peripheral device comprises a processor and a non-transitory computer-readable storage medium that stores instructions executable by the processor for controlling an advertising rate of a peripheral device. The advertising rate specifies how frequently the peripheral device attempts to communicate to a processing device to establish a connection with the processing device. In one embodiment, the peripheral device is initialized to transmit communications for the processing device according to a high advertising rate. The peripheral device attempts communications according to the high advertising rate until a connection is established or until a first predefined stopping criterion is met. Responsive to the first predefined stopping criterion being met prior to establishing the connection, the advertising rate is reduced to a medium advertising rate lower than the high advertising rate. The state of a sensor data buffer is monitored to determine whether or not the sensor data buffer is full and the peripheral device attempts communications according to the medium advertising rate until the connection is established or until a second predefined stopping criterion is met or until the peripheral device detects that the sensor data buffer is full. Responsive to the peripheral device detecting that the sensor data buffer is full, the advertising rate is increased to the high advertising rate. Responsive to the connection being established, the data stored in the sensor data buffer is sent to the processing device.

In an embodiment, after sending the data stored in the sensor data buffer to the processing device responsive to the connection being established, the peripheral device deletes the sent data from the sensor data buffer, receives control parameters from the processing device specifying a new advertising rate, and then operates the peripheral device according to the new advertising rate.

Furthermore, in one embodiment, responsive to the second predefined stopping criterion being met prior to establishing the connection and prior to determining that the sensor data buffer is full, the advertising rate is reduced to a low advertising rate lower than the medium advertising rate. The peripheral device then attempts communications according to the low advertising rate until the connection is established or until the peripheral device detects that the sensor data buffer is full.

In an embodiment, the peripheral device obtains sensor data using one or more sensors integrated with the peripheral device, stores the sensor data in the sensor data buffer, and wirelessly attempts connections to the mobile device to transfer the sensor data stored in the sensor data buffer to the processing device according to the advertising rate. Furthermore, the peripheral device acquires samples of the sensor data at a sampling rate set based on a control signal received from the processing device. Additionally, the processing device may set a duty cycle of the peripheral device and duty cycle the peripheral device between an active state in which the peripheral device acquires the samples at the sampling rate and a dormant state in which the peripheral device does not acquire the sensor data.

In another embodiment, a peripheral device wirelessly communicates sensor data to a processing device. The peripheral device comprises an air quality sensor, a buffer, and a communication interface. The air quality sensor acquires samples at a sample rate, the samples representing an air quality measure. The buffer temporarily stores the samples. The communication interface wirelessly attempts connections to the peripheral device according to an advertising rate, and when connected, communicate the acquired samples from the buffer and receive a control signal from the processing device to control the sampling rate and the advertising rate. Furthermore, the peripheral device may include an energy harvesting module to harvest energy from one or more ambient source and store the harvested energy to a battery.

BRIEF DESCRIPTION OF THE DRAWINGS

FIG. 12 is an embodiment of a lookup table for determining a sampling rate based on a mode of transport and a location.

FIG. 13 is an embodiment of a lookup table for adjusting a sampling rate based on a carbon monoxide level.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A peripheral device capable of being worn or carried by a user (e.g., a bracelet, tag, brooch, wristband, watch, etc.) operates in conjunction with an application executing on a mobile device to acquire, store, and present data relevant to a user's health, physical activity, environment, air quality, or other parameters of interest. Particularly, the peripheral device may provide information relevant to a journey that the user undergoes although it may also provide useful information when the user is stationary. For power efficient operation and enhanced performance, control parameters of the peripheral device such as duty cycle, sampling rate, and sleep state may be wirelessly and automatically controlled by the mobile device. Furthermore, the mobile application can provide a wireless energy signal to the peripheral device to recharge the battery of the peripheral device. The control parameters of the peripheral device may be automatically controlled by the mobile application dependent on the user's location, activity, mode of transportation, journey status (e.g., if an existing journey ends or if a new journey starts), or other parameters without manual intervention from a user.

Figure 1:
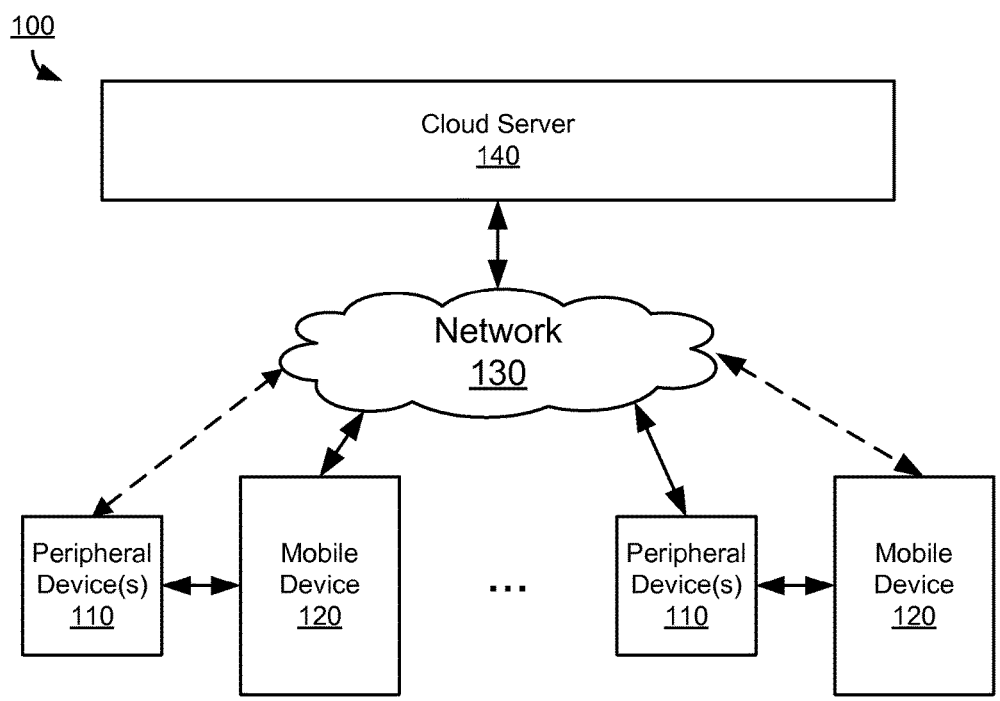
FIG. 1 is a block diagram of an embodiment of a computing environment including a mobile device controlling operation of a peripheral device.

FIG. 1 illustrates an embodiment of a computing environment 100 including a cloud server 140, a network 130, one or more mobile devices 120, and one or more peripheral devices 110. In alternative embodiments, different or additional devices may be present.

The peripheral device 110 comprises a user-wearable or user-carried electronic device such as an electronic bracelet, tag, brooch, wristband, watch, etc. that performs one or more electronic and/or mechanical functions. In one particular embodiment, the peripheral device 110 comprises an air quality sensor that senses various environmental parameters. In other embodiments, the peripheral device 110 may include additional or different components that may be used to provide data about a user's health, physical activity, environment, air quality, or other information to the user's daily activities such as working, resting, playing, sleeping, traveling, etc. The peripheral device 110 wirelessly connects to the mobile device 120 in order to exchange data and control information with the mobile device 120. For example, sensor data from the peripheral device 110 may be wirelessly transmitted to the mobile device 120. Furthermore, the mobile device 120 may transmit control signals to the peripheral device 110 to control various operating parameters of the peripheral device 110 such as the way it functions, the tasks it undertakes, how it is powered, how it is recharged, the type of data it collects, how frequently it collects data, the information that it outputs, how it communicates, what other devices it communicates with, the location of the mobile device 120, the separation distance between the user and the mobile device, etc. In additional embodiments, the peripheral device 110 may include a physical actuator that is actuated based on the operating parameters of the peripheral device 110. Furthermore, the peripheral device 110 may receive power from the mobile device 120 via a wireless charging signal that will be described in more detail below. In one embodiment, the connection between the peripheral device 110 and the mobile device 120 is via a peer-to-peer wireless communication protocol such as, for example, a NFC, Bluetooth, Zigbee, Ant+ protocol or Wifi Direct protocol. In other embodiment, the peripheral device 110 may communicate indirectly with the mobile device 120 via the network 130. In other embodiments, wired connections may be used.

In one embodiment, the peripheral device 110 is generally a passive device acting under instructions from the mobile device 120. For example, the peripheral device 110 may include limited processing power sufficient for tasks such as taking measurements, storing data, and communicating that data to the mobile device 120. This architecture advantageously means that peripheral device 110 can have only minimal technical capability and a corresponding energy budget sufficient for it to function. Furthermore, the peripheral device 110 can be designed as a simple, low-cost device. In other embodiments, varying levels of intelligence may be built directly into the peripheral device 110 which may trade off some power and cost for higher performance.

The mobile device 120 may comprise, for example, a mobile phone, a tablet device, a laptop computer, a smart watch, an e-book reader, or other computing electronic device. The mobile device 120 may execute one or more applications that can be used in conjunction with the connected peripheral device 110. For example, the mobile device 120 may operate to collect and process data from the peripheral device 110, control operating modes of the peripheral device 110, and/or provide power to the peripheral device 110 via a wireless charging signal. The mobile device 120 may furthermore perform other functions that enable it to intelligently control the peripheral device 110 as well as provide useful feedback to the user regarding the user's health, physical activity, environment, air quality, or other information based on the acquired information. Furthermore, the mobile device 120 may include various sensors or data collection systems such as a location sensor (e.g., a global positioning system), a velocity sensor, an accelerometer, orientation sensor, etc. In one embodiment, the mobile device 120 processes the location information (and optionally other collected data) to determine the user's current environment, e.g., whether the user is indoor or outdoor. Optionally, this detection may further include determining if the outdoor environment is a typical environment in which average air quality is expected or a city center environment where there is high risk of poor air quality. Furthermore, as will be described in further detail below, the mobile device 120 may track a user's location and analyze motion data from sensors to accurately predict a user's activity or mode of transport. For example, the mobile device 120 may process the various data to determine if the user is actively undertaking a journey and if so, determining a mode of transport, if any, being used on the particular journey undertaken by the user. Additionally, the mobile device 120 may the process the data to determine when the journey starts and when it ends. Based on the location information, the determined mode of transport, and/or other data obtained by the mobile device 120, the mobile device 120 controls operating parameters of the peripheral device 110. For example, the mobile device 120 may control a state of the peripheral device 110 (e.g., a sleep state or an active state), a sampling rate for the sensors of the peripheral device, an advertising rate for attempting connections to the mobile device 120 during which the peripheral device may transfer data from the peripheral device 110 to the mobile device 120 and receive control parameters from the mobile device 120, and what type of data the peripheral device 110 provides to the mobile device 120. Additionally, the mobile device 120 may control a physical actuator of the peripheral device 110. Furthermore, the location information and the mode of transport may be used to determine whether or not the mobile device 120 will provide a wireless charging signal to the peripheral device 110 to wirelessly charge the battery of the peripheral device 110.

The network 130 may comprise one or more networks, such as the Internet, a WiFi network, a telephone network, a cellular data network, etc. The network 130 may also comprise a virtual private network (VPN), a local area network (LAN), a wide area network (WAN), or any other form of network. The network 130 provides wireless and/or wired connectivity between the entities connected to it including, for example, a plurality of mobile devices 120, one or more cloud servers 140, and optionally, one or more peripheral devices 110.

The cloud server 140 is coupled to a plurality of mobile devices 120 via the network 130. The cloud server 140 receives data collected by the mobile devices 120, data collected by the peripheral devices 110 (either directly or via the mobile device 120), and/or various statistics, decisions, or operating parameters determined by the mobile device 120 based on the acquired data. Furthermore, the cloud server 140 may store account information to associate data with an individual user account. In one embodiment, the cloud server 140 performs statistical analysis, predictive modeling, or other computationally intensive processes based on data provided by multiple mobile devices 120 and/or the peripheral devices 110. The cloud server 140 then provides processed results to each mobile device 120 to enable the mobile device 120 to make even more intelligent decisions based on collective data analysis about what information to provide to the user or how to set control parameters used to control the peripheral device 110. This processing by the cloud server 140 may be based on data from an individual user account, or may be based on data across a plurality of user accounts. Additionally, the cloud server 140 stores applications and/or firmware that can be downloaded to the mobile device 120 or to the peripheral device 110 that enables the devices to carry out the functions described herein. Alternatively, the statistical analysis and predictive modeling discussed above may be performed directly on the mobile device 120 using its own set of data.

Figure 2:
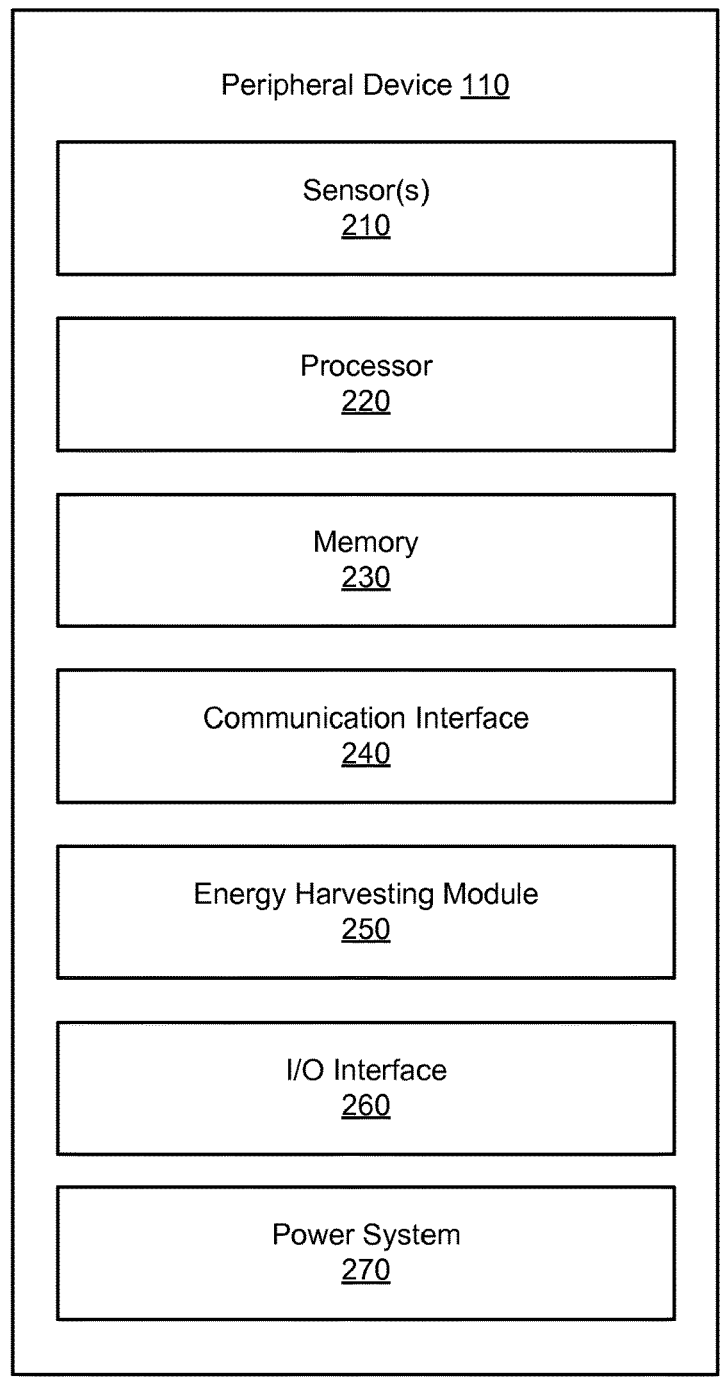
FIG. 2 is a block diagram of an embodiment of a peripheral device.

FIG. 2 illustrates an example embodiment of a peripheral device 110 comprising one or more sensors 210, a processor 220, a memory 230, a communication interface 240, an energy harvesting module 250, an input/output interface 260, and a power system 270.

The processor 220 comprises a general purpose or application specific processor that processes instructions from the memory 230 (e.g., a non-transitory computer readable storage medium) to carry out the functions attributed to the peripheral device 110 described herein. The memory can be a volatile or non-volatile storage medium that stores instructions for execution by the processor 220 and additionally stores data obtained by the sensors 210, control parameters received from the mobile device 120, or other information used to operate the peripheral device 110.

The sensor(s) 210 can include any devices that obtain information about the surrounding environment. In a particular embodiment, the sensors 210 include at least a carbon monoxide sensor and a temperature sensor that provide information about the ambient air quality. In other embodiments, the peripheral device 110 may include accelerometers, orientation sensors, location sensors, velocity sensors, light sensors, vibration sensors, a camera, a microphone, pulse sensors, biopotential sensors for EEG/EMG/ECG, non-invasive glucose sensors, non-contact biosensors, humidity sensors, motion sensors, pressure sensors, a biomechanical function monitor, or other integrated electronics. As will be described below, the sensors 210 sample data based on a controllable sampling rate that may vary under different operating conditions.

The communication interface 240 communicates with the mobile device 120 and optionally with the network 130 or other peripheral devices 110. The communication interface 240 may operate according to a wired or wireless protocol such as, for example, NFC, Bluetooth, Zigbee, ANT+, WiFi Direct, WiFi, WiMax, a cellular communication protocol, or other communication protocol.

The input/output interface 260 includes mechanical or electronic mechanisms to enable a user to provide inputs directly to the peripheral device 110 such as, for example, a mechanical actuator, a button, a dial, a touchscreen, a voice recognition system, etc. Furthermore, the input/output interface 260 may include mechanical or electronic mechanisms for providing feedback to a user such as, for example, one or more light emitting diodes (LEDs), a display screen, a speaker, a haptic feedback device, etc. In other embodiments, more complex outputs may be provided such as, for example, a drug delivery system that enables the peripheral device 110 to inject or otherwise provide a drug dosage directly to a user.

The power system 270 includes a battery and related circuitry for providing power to the peripheral device 110. The energy harvesting module 250 provides one or more energy harvesting components such as an antenna, rectifier, and power management module to capture energy from the ambient environment and store the captured energy to a battery of the power system 270. For example, the energy harvesting module 250 may comprise circuits that capture energy from sources such as radio frequency (RF) signals provided by the mobile device 120, solar power, thermal energy, wind energy, and kinetic energy. In one embodiment, RF energy from Bluetooth or WiFi signals originating at the mobile device 120 or other neighboring devices can be harvested by the energy harvesting module 250 to charge the battery. In an embodiment, the energy harvesting module 250 on the peripheral device 110 comprises a passive module that is always enabled and detecting available ambient energy. If the available energy is above a certain threshold for driving a rectifier (e.g., meeting a condition sufficient to switch on a diode in the rectifier) then the energy harvesting module 250 collects the ambient RF energy, rectifies it from AC to DC, and stores it to the battery. In alternative embodiment, the energy harvesting module 250 may be actively turned enabled or disabled based on a control signal (e.g., from the mobile device 120).

In other alternative embodiments, the peripheral device 110 may include additional components such as, for example, a physical actuator such as a solenoid, relay, or other electromechanical device.

Figure 3:
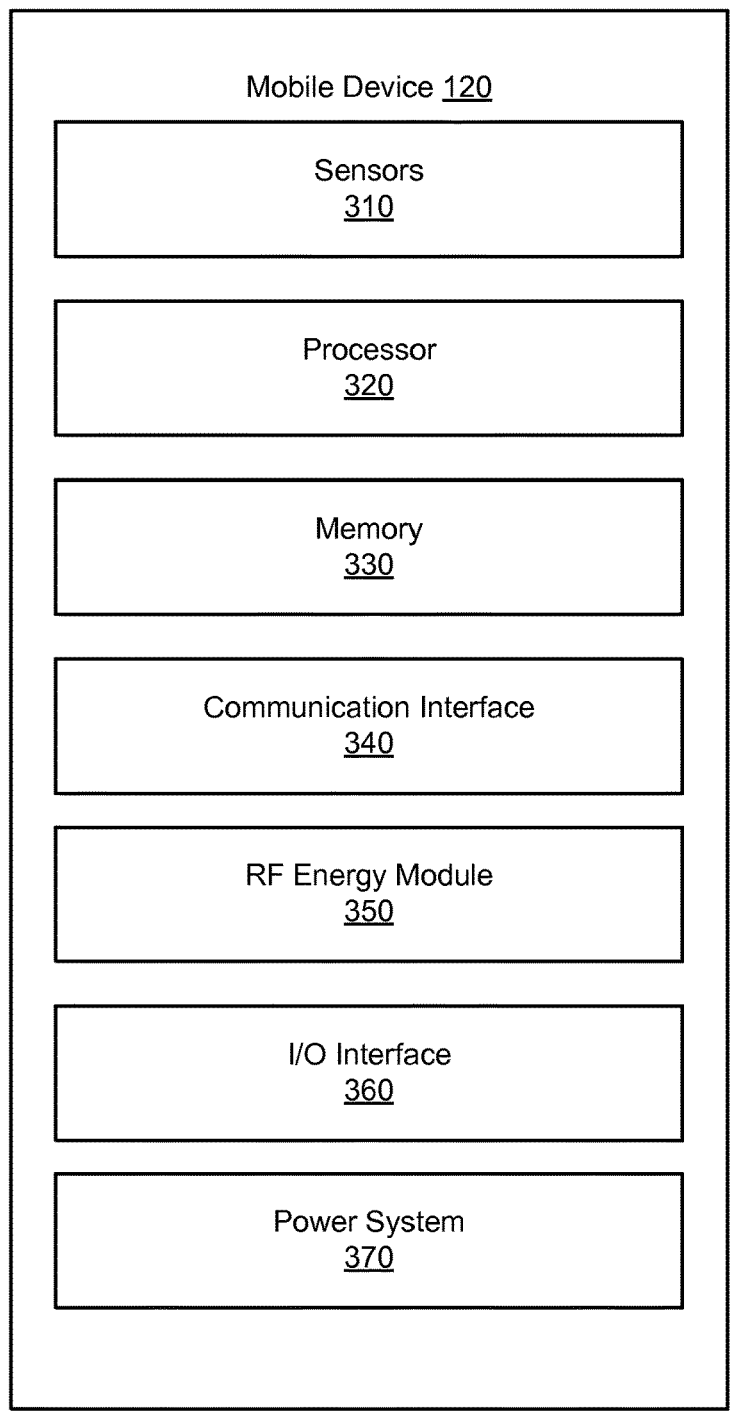
FIG. 3 is a block diagram of an embodiment of a mobile device.

FIG. 3 illustrates an example embodiment of a mobile device 120 comprising a processor one or more sensors 310, a processor, 320, a memory 330, a communication interface 340, an RF energy module 350, an input/output interface 360, and a power system 370.

The processor 320 comprises a general purpose or application specific processor that processes instructions from the memory 330 (e.g., a non-transitory computer readable storage medium) to carry out the functions attributed to the mobile device 120 described herein. The memory can be a volatile or non-volatile storage medium that stores instructions for execution by the processor and additionally stores data obtained by the sensors 310, data received from the peripheral device 110, data received from the cloud server 140, data determined by the processor 320 (e.g., a determined mode of transport for a particular journey), or other information used to communicate with or control the peripheral device 110.

The sensor(s) 310 can include any devices that obtain information about the surrounding environment. In a particular embodiment, the sensors 310 include at least a location sensor (e.g., a global positioning system). In other embodiments, the sensors 310 may include accelerometers, magnetometers, orientation sensors, velocity sensors, light sensors, vibration sensors, a camera, a microphone, or other integrated electronics.

The communication interface 340 communicates with the peripheral device 110 and with the network 140 or other mobile devices 120. The communication interface 340 may operate according to one or more wired or wireless protocols such as, for example, Bluteooth, WiFi Direct, WiFi, WiMax, a cellular communication protocol, or other communication protocol.

The input/output interface 360 includes mechanical or electronic mechanisms to enable a user to provide inputs to the mobile device 120 such as, for example, a mechanical actuator, a button, a dial, a touchscreen, a voice recognition system, or other features conventionally found on a mobile device. Furthermore, the input/output interface 260 may include mechanical or electronic mechanisms for providing feedback to a user such as, for example, one or more light emitting diodes (LEDs), a display screen, a speaker, a haptic feedback device, or other features conventionally found on a mobile device.

The power system 370 includes a battery and related circuitry for providing power to the mobile device 120.

The RF energy module 350 includes circuitry for generating a wireless energy signal that can be captured by the energy harvesting module 250 of the peripheral device 110 in order to enable the mobile device 120 to transfer power from its power system 370 to the power system 270 of the peripheral device 110. In one embodiment, the RF energy module 350 is integrated with the communications interface 340 and the RF energy signal is generated via wireless communication elements used for Wifi, Bluetooth, or other wireless communication.

For example, in one embodiment, the RF energy module 350 controls Wifi and/or Bluetooth modules to enter a scanning mode at maximum allowable power in which they continuously scan different channels to discover nearby service and peers. Responses from nearby devices that pick up the scanning signal are ignored, thus causing the RF energy module 350 to continue to generate the RF signal. In some embodiments, the frequency at which the scanning function can be initiated is limited by the operating system of the mobile device 120. In this case, the scanning function may be initiated at the highest allowable frequency to provide the maximum allowable energy signal. This signal can be harvested by the energy harvesting module 250 of the peripheral device 110.

Figure 14:
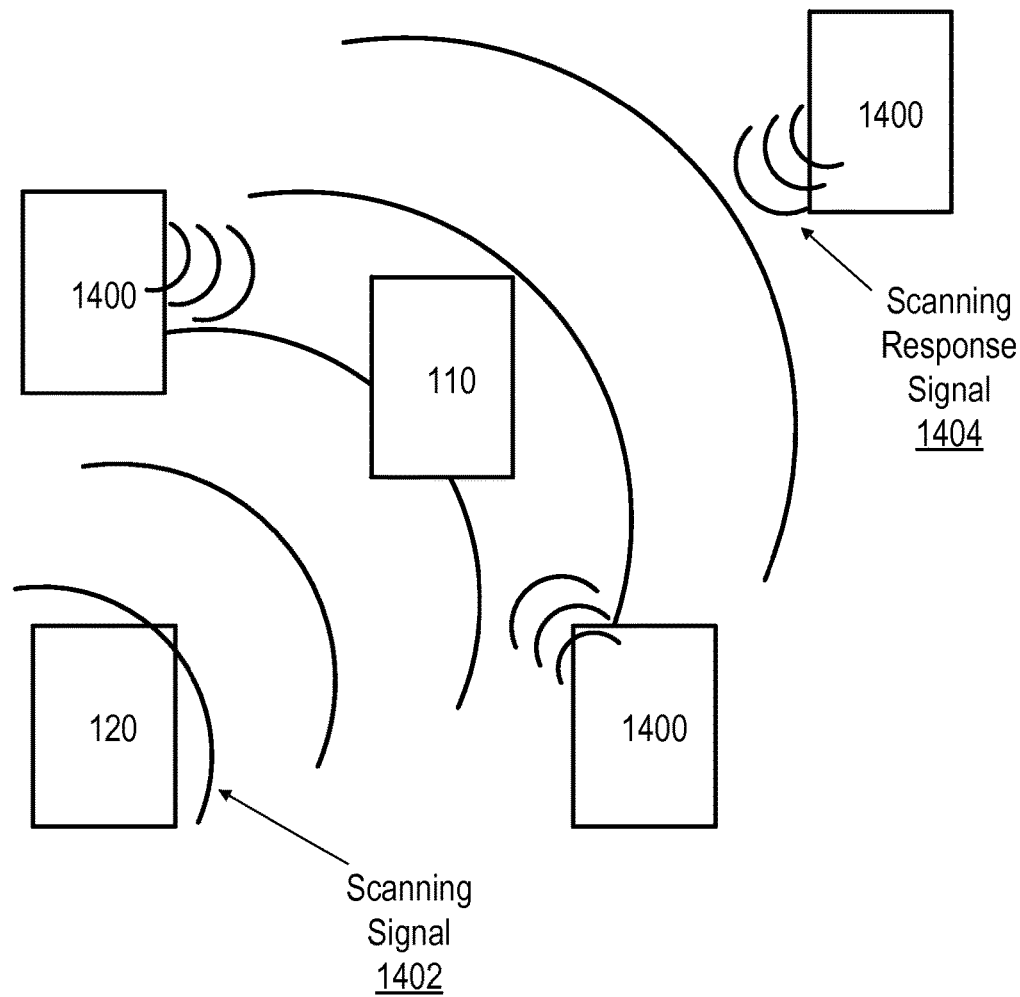
FIG. 14 is an embodiment of environment in which a peripheral device harvests energy from multiple neighboring devices.

In one embodiment, the RF energy module 350 of the peripheral device 110 may harvest RF energy from one or more neighboring devices in addition to RF energy from the mobile device 120 and/or ambient RF energy. FIG. 14 illustrates an embodiment of an environment in which a peripheral device 110 may harvest RF signal energy from multiple device. Here, the mobile device 1402 provides a scanning signal 1402 (e.g., WiFi or Bluetooth) to scan for other devices in the vicinity. This scanning signal 1402 contains RF energy that may be harvested by the peripheral device 110. Furthermore, other neighboring devices 1400 detect the scanning signal 1402 and automatically respond to the scanning signal 1402 via a scanning response signal 1404 in order to try to connect to the mobile device 120. The scanning response signals 1404 are ignored by the mobile device 120 so that no connection is made and both the mobile device 120 and other neighboring devices 1400 continue to send their respective signals 1402, 1404. The scanning response signals 1404 contain additional RF energy that may be harvested by the peripheral device 110. Thus, using the described technique, the mobile device 120 can facilitate additional sources of energy for harvesting by the RF energy module 350 of the peripheral device 110 in addition to other ambient RF energy sources that may be available.

The mobile device 120 may additionally include other components traditionally found in a mobile device such as a mobile phone, tablet, or laptop. For example, in other alternative embodiments, the mobile device 120 may include, for example, a physical actuator such as a solenoid, relay, or other electromechanical device.

Figure 4:
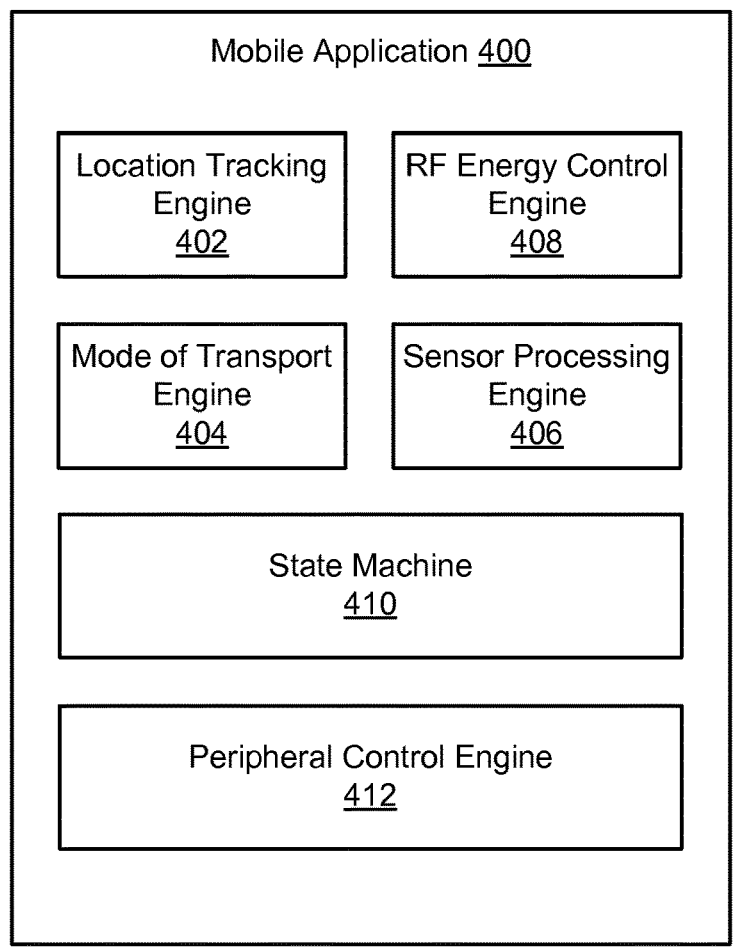
FIG. 4 is a block diagram of an embodiment of a mobile application for controlling a peripheral device.

FIG. 4 illustrates an example embodiment of a mobile application 400 executing on the mobile device 120. In alternative embodiments, the mobile application 400 or portions of the functionality attributed to it herein may operate partly or entirely on the cloud server 140 or on the peripheral device 110. The mobile application 400 comprises instructions stored on a non-transitory computer-readable storage medium (e.g., the memory 330) and executed by the processor 320 (or a different processor) to carry out the functions attributed to the mobile application 400 described herein. The mobile application 400 is described herein as a plurality of functional modules including a location tracking engine 402, a mode of transport engine 404, a sensor processing engine 406, an RF energy control engine 408, a state machine 410, and a peripheral control engine 412. In other embodiments, the mobile application 400 may have fewer, different, or additional functional modules and the functions attributed to one or more modules may be carried out by different modules or by a combination of modules.

The location tracking engine 402 receives and processes data from the sensors 310 (and optionally from sensors 210 of the peripheral device 110) to determine a location of the mobile device 120 on which the mobile application 400 executes. For example, in one embodiment, the location tracking engine 402 uses GPS data to determine the location. In other embodiments, less precise location information may be obtained based on a mobile positioning information to provides an approximate location of the mobile device 120 based on measuring power levels and antenna patterns received by the mobile device 120 that determine the location relative to a base station. In other embodiments, the location tracking engine 402 can use other sensor data such as accelerometer data or velocity sensing data to predict or refine the determined location. In an embodiment, the location tracking engine 402 stores a history of location samples together with timestamps to track a particular path of the mobile device 210 over time. The location tracking engine 402 may similarly track velocity and/or acceleration data over time.

The mode of transport engine 404 determines whether a journey is being undertaken by a user carrying the mobile device 120 (including when the journey starts and ends) and determines a type of the journey. For example, the mode of transport engine 404 may determine whether the user is on a bus, in a car, on a train, on a plane, on a bicycle, or on foot. In other embodiment, the mobile device 120 may make an even more specific determination such as determining that the user is in a taxi, on a tram, on a monorail train, on an underground train, on a motorcycle, on a moped, on a boat, or using self-propelled means such as scooters, skateboards, roller-skates, rollerblades, etc. In one embodiment, the mode of transport engine 404 determines the type of journey by processing location, velocity, and/or acceleration data and applying a classification model (e.g., a machine-learned classification model) to determine which type of journey best matches the data. For example, a journey characterized by relatively slow acceleration and relatively high top speeds may be indicative of train transportation, a journey characterized by faster acceleration and frequent changes in velocity may be indicative of car travel, and very slow velocities may be indicative of travel by foot. Furthermore, in one embodiment, the known locations of roads, railroad tracks, airports, sidewalks, or water may furthermore be used as inputs to determine the type of journey. In other embodiments, additional input data may be inputted to the model such as, for example, air quality information obtained from the peripheral device 110. For example, low levels of carbon monoxide may be indicative of travel in an electric vehicle while high levels of carbon monoxide may be indicative of travel in a vehicle having a traditional combustion engine. The mode of transport engine 404 may furthermore determine and store a beginning time and end of time of a particular journey. In an embodiment, the mode of transport engine 404 stores a history of journeys together with timestamps indicating when the journeys took place.

The sensor processing engine 406 acquires and processes sensor data from the peripheral device 110 and/or from the sensors 310 of the mobile device 120. The sensor processing engine 406 may generate a set of metrics based on one or more raw types of data that are used by other modules of the application to carry out their functions. For example, the sensor processing engine 406 may generate an air quality metric representing an overall level of air quality based on data pertaining to carbon monoxide levels, temperature, or other sensor data.

The RF energy control engine 408 controls the RF energy module 350. For example, the RF energy control engine may control the on or off state of the RF energy module 350, a strength of the RF energy signal, a duration of the RF energy signal, a duty cycle of the RF energy signal, etc. The RF energy control engine 408 may control the RF energy module 350 based on various parameters such as a battery state of the peripheral device 110, a battery state of the mobile device 120, whether or not the mobile device 120 is plugged into a power source, location data, a determination of whether a power source is likely to be present at the current location, the mode of transport, etc.

The state machine 410 processes data received from other application modules and determines an operating state in which to operate the peripheral device 110. In one embodiment, the state machine 410 receives at least the determined mode of transport from the mode of transport engine 404 and the location data from the location tracking engine 402 and transitions between operating states based on the mode of transport, the location data, and current operation state. In other embodiments, additional data may be used to determine the operating state including, for example, other types of sensor data, a battery state of the peripheral device 110 and/or the mobile device 120, a history of previous states, or other data available to the mobile application 400. Furthermore, in one embodiment, the state machine 410 makes decisions based on a learning algorithm that is able to identify patterns, habits, and routines in the data over time, which enables the state machine 410 to make accurate predictions and good decisions even when the available data is incomplete or of low quality. The determined operation state controls various control parameters of the peripheral device 110 and/or the mobile device 120.

For example, in one embodiment, the state machine 410 controls when the peripheral device 110 actively gathers data or stops gathering data (e.g., enter a dormant mode) depending on the location and/or mode of transportation or other parameters. Here, the state machine 410 may control the peripheral device 110 to actively gather data when it determines that the user is undertaking activities such as exercising, cycling, running, or traveling by bus, or when the user is in a certain location such at the gym, traveling a certain route, or between two identified locations. In another example, certain military equipment carried by a soldier may be energized depending on whether the soldier is on the ground or traveling in a vehicle. The state machine 410 can furthermore automatically trigger the peripheral device 110 to start gathering data at the start of a journey or activity and stop gathering data at the end of a journey or activity. Furthermore, the state machine 410 can change the operation of the peripheral device in response to detecting a change in the location, mode of transport, or activity.

In one embodiment, the operation state furthermore controls the sampling rate at which the peripheral device 110 obtains samples of sensor data and a duty cycle for cycling between different power modes (e.g., a dormant mode or one or more active modes). For example, the state machine 410 may control the peripheral device 110 to gather data at a relatively high frequency when it determines that it is in a certain location or mode of transport in which the data is interesting but of low quality (thus benefiting from more measurements to increase accuracy) and is controlled to gather data at relatively low frequency when in other locations or modes of transport where the data is not interesting or is of high quality (thus saving power by taking fewer measurements). In another embodiment, the state machine 410 controls the data gathering behavior of the peripheral device 110 to automatically change to a high sampling rate and/or duty cycle when it detects environmental conditions meeting certain criteria. For example, the high sampling rate may be applied if a threshold level of high carbon monoxide is detected. Furthermore, in one embodiment, the state machine 410 may trigger an external alarm or emergency message in the peripheral device 110.

In yet another embodiment, the state machine 410 may control the sampling rate of the peripheral device 410 based on other factors such as environmental sensor data or biometric sensor data obtained from the peripheral device 110. For example, through biometric sensing the state machine 410 may determine when an asthma patient or COPD patient is having an episode and increase the sampling rate during the episode, and decrease the sampling rate as soon as the episode finishes.

In yet another embodiment, the state machine 410 receives information from the peripheral device 110 indicating a rate of wireless energy harvested by the peripheral device 110 from ambient sources. The state machine 410 then controls the sampling rate or other parameters of the peripheral device based on the rate of wireless energy being harvested.

In another embodiment, the operation state also controls whether or not the mobile device 120 provides the RF energy signal (via the RF energy module 350) to the peripheral device 110 and/or the strength and duration of such a signal. For example, in embodiments where the energy harvesting module 250 is not always enabled, the state machine 410 may control the peripheral device 110 to automatically turn on the energy harvesting module 250 (or components thereof) when the location and mode of transport information indicates the user will be in a certain area for a certain amount of time that has a high power density of ambient energy.

In one example operating scenario, if the battery level of the peripheral device 110 drops below a threshold and there is no ambient power available, then the peripheral device 110 requests that the mobile device 120 provide the wireless charging signal. The application 400 then decides whether or not to provide the charging signal. The application 400 may in some circumstances determine not to provide the charging signal, for example, if the battery level of the mobile device 120 is below a threshold or another ambient energy source is available and it is preferable for the peripheral device 110 to harvest energy from that source instead. In the event that the charging signal from the mobile device and other ambient energy sources are not available, the state machine 410 may cause the peripheral device 110 to enter a low energy state in which sensor data is collected at a low sampling rate to conserve battery power.

In other embodiments, the operation state may control other operating parameters of the peripheral device 110 such as controlling the I/O interface 260 of the peripheral device 110. For example, the state machine 410 may provide a trigger to cause the peripheral device 110 to provide audible, visual, or haptic alerts dependent on the user's geophysical location, transport mode, or acquired sensor data. The state machine 410 may cause the peripheral device 110 to issue an alert when the state machine detects when the user is in a certain location, has entered a certain area, or has changed mode of transport. Furthermore, the state machine 410 may cause the peripheral device 110 to issue an alert when air quality levels are detected to drop below some predefined threshold. In yet further embodiments, the state machine 410 may similarly control the input/output interface 360 of the mobile device 120 to provide alerts based on the sensed information or to perform some action. For example, the mobile device 120 may provide alerts to help the user stay within or avoid particular locations (e.g., billing or toll zones). In another embodiment, the mobile application may detect when the user is approaching a public transit station and automatically purchase ticketless travel via a connection to the network 130. In yet another embodiment, the state machine 410 controls the peripheral device 110 to automatically turn on and activate an alert with accurate location and journey information if a user's journey deviates from a predetermined route or an expected mode of transport, or if a user's speed unexpectedly remains at zero for a certain length of time partway through a regular routine journey.

In yet other embodiments, the state machine 410 may control the peripheral device 110 to trigger a physical actuator such as a solenoid, relay, or other electromechanical device.

While a single state machine 410 is illustrated in FIG. 4 for conciseness of description, in some embodiments, the application 400 may include multiple state machines 410 each controlling a different control parameter. For example, a first state machine controls the sampling rate, a second state machine controls the duty cycle, a third state machine controls the RF energy module 350, etc.

The peripheral control engine 412 sends control parameters to the peripheral device 110 based on the determined operating state. For example, the peripheral control engine 412 may specify a sample rate, duty cycle, advertising rate, power mode, etc. In one embodiment, the peripheral control engine 412 sends signals to control individual parameters of the peripheral device 110. In another embodiment, the peripheral control engine 412 communicates the operating state and the peripheral device 110 determines how to control individual control parameters based on the specified operating state (e.g., using a lookup table).

Figure 5:
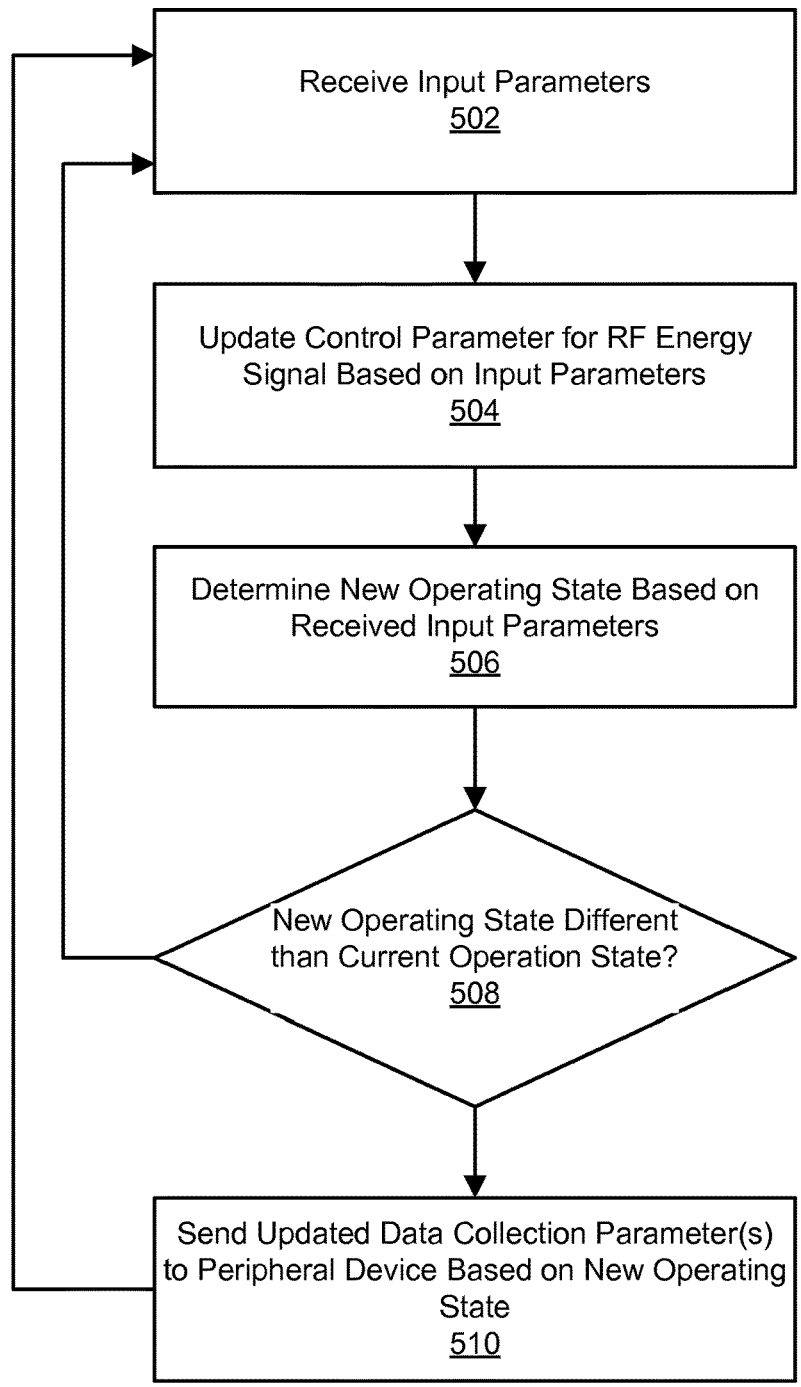
FIG. 5 is a flowchart illustrating an embodiment of a process for controlling a peripheral device.

FIG. 5 illustrates an embodiment of a process for controlling operation of a peripheral device 110. The application 400 receives 502 input parameters which may include, for example, location data, mode of transport, battery state of the peripheral device 110 and mobile device 120, and/or other available parameters. The application 400 updates 504 control parameters of the RF energy module 350 based on the input parameters. For example, the RF energy module 350 may be turned on or off, or the strength, duty cycle, duration, or other operating parameters may be modified. The application 400 also determines 506 a new operating state for controlling the peripheral device 110 based on the received input parameters, and determines 508 if the new operating state is different than the current operating state. If the new operating state is not different, the process returns to step 502 for the next processing period. If the new operating state is different than the current operating state, the application 400 causes the mobile device 120 to send 510 updated data collection parameters to the peripheral device 110 based on the new operating state. For example, the mobile device 120 may send an indication of the new state or specific data collection parameters that it determines. Because the environment around the peripheral device 110 can have a great impact on the quality of the sensor data itself, the application 400 is able to use and interpret the available data intelligently to update the state, thereby changing the data gathering behavior of the peripheral device 110 to enhance quality of the collected data. In one embodiment, each iteration of the process of FIG. 5 is triggered after a predefined time period. In another embodiment, an activating event may trigger an iteration of the process such as, for example, detecting changes in sensor data or battery state.

Figure 6:
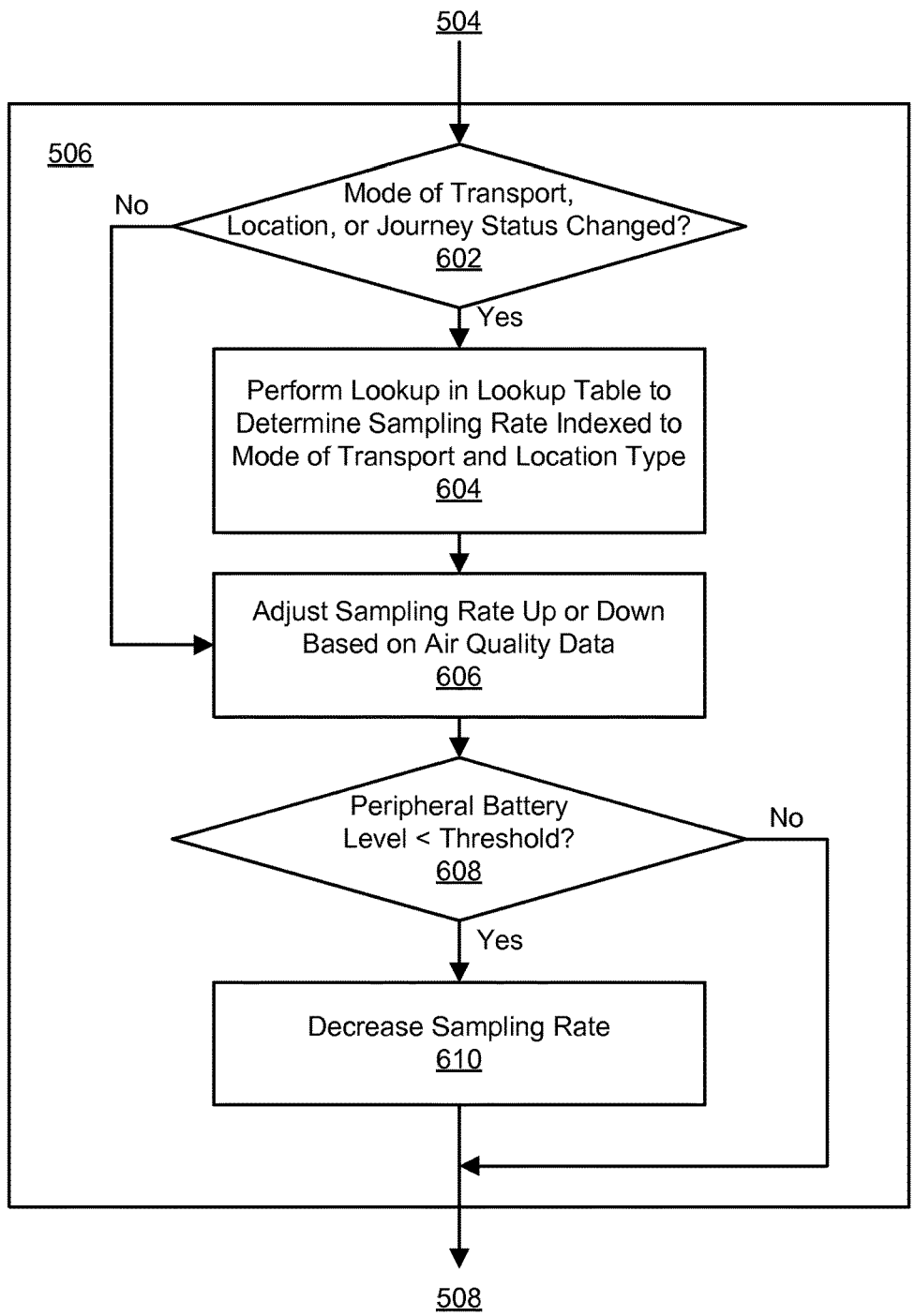
FIG. 6 is a flowchart illustrating an embodiment of a process for determining a sampling rate of a peripheral device.

FIG. 6 is a flowchart illustrating an embodiment of a process for determining 506 an operating state for controlling the peripheral device 110. Specifically, this embodiment provides an example in which the input parameters include the mode of transport, location, and peripheral device battery state, and the operating state dictates a sampling rate used by the peripheral device to obtain sensor data. The application 400 determines 602 if the mode of transport, location, or journey status (e.g., if an existing journey ends or if a new journey starts) has changed. If either has changed, the application 400 performs 604 a lookup in a lookup table to determine a sampling rate that is indexed to the specified mode of transport and location type. Otherwise, if neither has changed, step 604 is skipped. The sampling rate may then be adjusted 606 up or down depending on an air quality metric (e.g., a carbon monoxide level obtained from the sensor data of the peripheral device 110). For example, in one embodiment, the lookup table (if the mode of transport, location, or journey status has changed) or the current sampling rate (if the mode of transport, location, and journey status has not changed) provides a base sampling rate. The base sampling rate is then adjusted up if the carbon monoxide level exceeds a predefined upper threshold and the sampling rate is not already at the maximum level, and the base sampling rate is adjusted down if the carbon monoxide level is below a lower threshold and the sampling rate is not already at the minimum level. In one embodiment, a lookup table may be used to determine how to adjust the sampling rate based on the carbon monoxide level. The application also determines 608 if the battery level of the peripheral device 110 is below a predefined battery threshold. If the battery level is below the threshold, the sample rate is decreased 610 from the base level if it is not already at the minimum level. Otherwise, this step 610 is skipped.

An example lookup table is provide in FIG. 12 based on an embodiment in which the mode of transport is selected from static, walk/run, bike, bus, car, and train, and the location is selected from indoor, outdoor typical, and outdoor city center. Furthermore, in the example lookup table, the sampling rate is set to either low, medium, or high. In an embodiment, some combinations are not possible based on the design of the location tracking engine 402 and mode of transport engine 404 such as, for example, detecting transport by bus, car, or train while the location is indoor. Generally, the lookup table causes the peripheral device 110 to operate with a high sampling rate when the mode of transport and location suggests that the air quality is more likely to be poor and therefore the user is likely interested in higher quality measurements. In other embodiments, a lookup table may include additional location and mode of transport variables, different sampling rate levels, or additional dimensions accounting for other factors that may affect sampling rate.

In other embodiments, an intelligent algorithm may be used rather than a lookup table to automatically adjust the sampling rate. For example, a learning algorithm may be used to make predictions about air quality under different conditions and adjust the sampling rate higher when it is predicted that there is risk of poor air quality (thus high sampling rate to acquire more reliable data is desired) or it is predicted that individual samples may be unreliable (thus a high sampling rate is desirable to enable more accurate data analysis).

FIG. 13 illustrates an example lookup table that may be used to determine how to adjust the sampling rate from the base sampling rate dependent on the carbon monoxide level. In this example, the carbon monoxide level is characterized as high if it is above an upper threshold (and the data is therefore considered critical), medium if it is between the upper threshold and a lower threshold, and low if it is below the lower threshold (and the data is therefore considered non-critical). If the carbon monoxide level is high, the sampling rate is increased (e.g., one level) if the base sampling rate is low or medium and stays high if the base sampling rate is high. If the carbon monoxide level is low, the sampling rate is decreased (e.g., one level) if the base sampling rate is high or medium and stays low if the base sampling rate is low. If the carbon monoxide level is medium and the base sampling rate is low, the sampling rate is increased from the base sampling rate only if the carbon monoxide level was previously (e.g., within a threshold time frame earlier) low and thus the carbon monoxide level appears to be increasing. Otherwise, if the carbon monoxide level was previously medium or high (thus indicating a decreasing or stable carbon monoxide level), the sampling rate remains low. Similarly, if the carbon monoxide level is medium and the base sampling rate is high, the sampling rate is decreased from the base sampling rate only if the carbon monoxide level was previously (e.g., within a threshold time frame earlier) high and thus the carbon monoxide level appears to be decreasing. Otherwise, if the carbon monoxide level was previously medium or low (thus indicating an increasing or stable carbon monoxide level), the sampling rate remains high. If the carbon monoxide level is medium and the base sampling rate is medium, no change is made from the base sampling rate.

Figure 7:
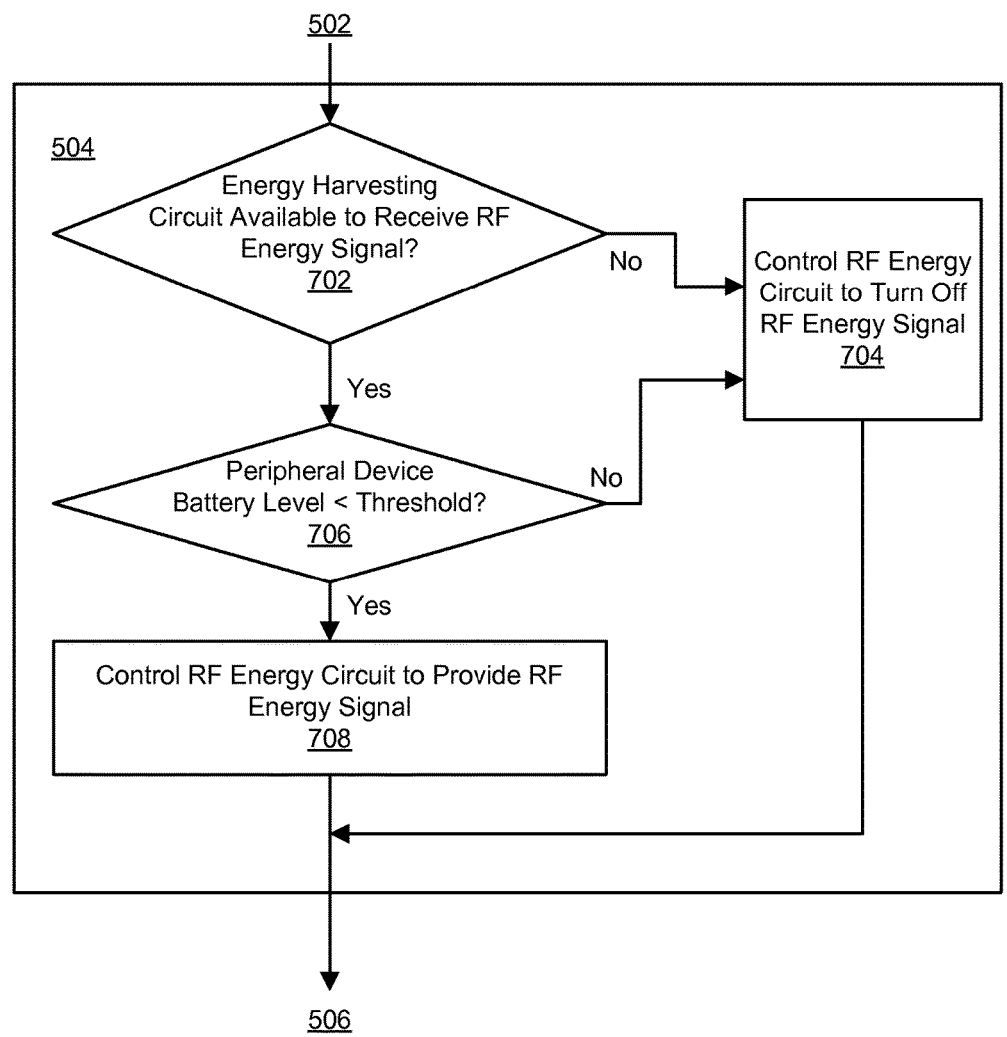
FIG. 7 is a flowchart illustrating an embodiment of a process for controlling an RF energy module to provide wireless energy to a peripheral device.

FIG. 7 illustrates an embodiment of a process for updating 504 control parameters of the RF energy module 350 of the mobile device 120. The application 400 determines 702 if the energy harvesting module 250 of the peripheral device 110 is available to receive the RF energy signal. This step may include, for example, determining if the peripheral device 110 is within close enough proximity to the mobile device 120 to successfully harvest the signal, determining if enough other ambient energy sources are available to harvest instead of the RF energy signal, and/or in embodiments where the energy harvesting module 250 can be enabled or disabled, determining whether it is enabled. If the module 250 is not available to receive the RF energy signal, the application 400 controls 704 the RF energy module 350 to turn off the RF energy signal. Otherwise, the application 400 determines 706 if the battery level of the peripheral device 110 is below a predefined battery threshold. If it is not below the threshold, the application 400 controls 704 the RF energy module 350 to turn off the RF energy signal. Otherwise, if the battery level is below the battery threshold, the application 400 controls 708 the RF energy module 350 to output the RF energy signal so that it can be harvested by the peripheral device 110. In some embodiments, the peripheral device 110 may determine whether the RF energy signal is desired and put out a request for an RF energy signal based on the determination. In other embodiments, additional factors may be used to determine whether or not to provide the RF energy signal. For example, in one embodiment, step 706 also includes determining if the battery of the mobile device 120 is above a threshold and controlling the RF energy module 350 to provide the RF energy signal only if the battery level of the peripheral device 110 is below a first threshold and the battery level of the mobile device 210 is above a second threshold. In other embodiments, additional factors may be used.

In an example use case, the user is outdoors and aboard a bus. The location tracking engine 402 and the mode of transport engine 404 identify that the user is outdoors using a bus on an urban route. The current state of the peripheral device 110 is measuring only moderate levels of carbon monoxide but at a high sampling rate and the battery level is getting low. The energy harvesting module 250 of the peripheral device 110 cannot detect any ambient energy sources and puts out a request for a wireless charging signal from the mobile device 120. The application 400 on the mobile device 120 determines based on the available data to issue a "please charge" signal to peripheral device 110 and causes the peripheral device 110 to output a display or audible warning. The application 400 furthermore controls the peripheral device 110 to decrease the sampling rate to conserve battery. The application 400 determines that the battery of the mobile device 120 is sufficiently charged and controls the RF energy module 350 to generate a wireless charging signal to transfer energy to the energy harvesting module 250 of the peripheral device 110.

Figure 8:
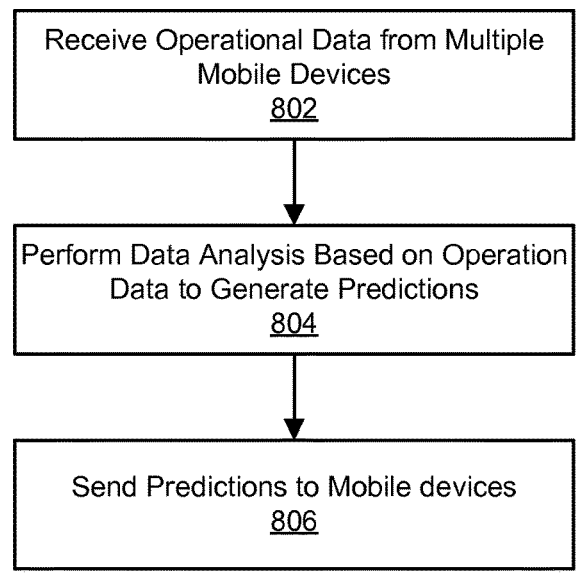
FIG. 8 is a flowchart illustrating an embodiment of a process for generating predictions used by a mobile device to control an operating parameter of a peripheral device.

FIG. 8 illustrates an embodiment of a process performed by the cloud server 140 for generating control information used by the mobile device 120 to control the peripheral device 110. The cloud server 140 receives 802 operational data from one or more mobile devices 120 each in communication with a respective peripheral device 110. The cloud server 140 performs 804 a data analysis of the operational data to generate predictions used by the mobile device 120 to switch between operational states or determine various control parameters. The predictions are sent 806 to the mobile device 120. The predictions may be used directly by the mobile device 120 to determine a new state for controlling an attached peripheral device 110, or the predictions may be used more generally to update a model that the mobile device 120 uses to make the state transition decision.

Figure 9:
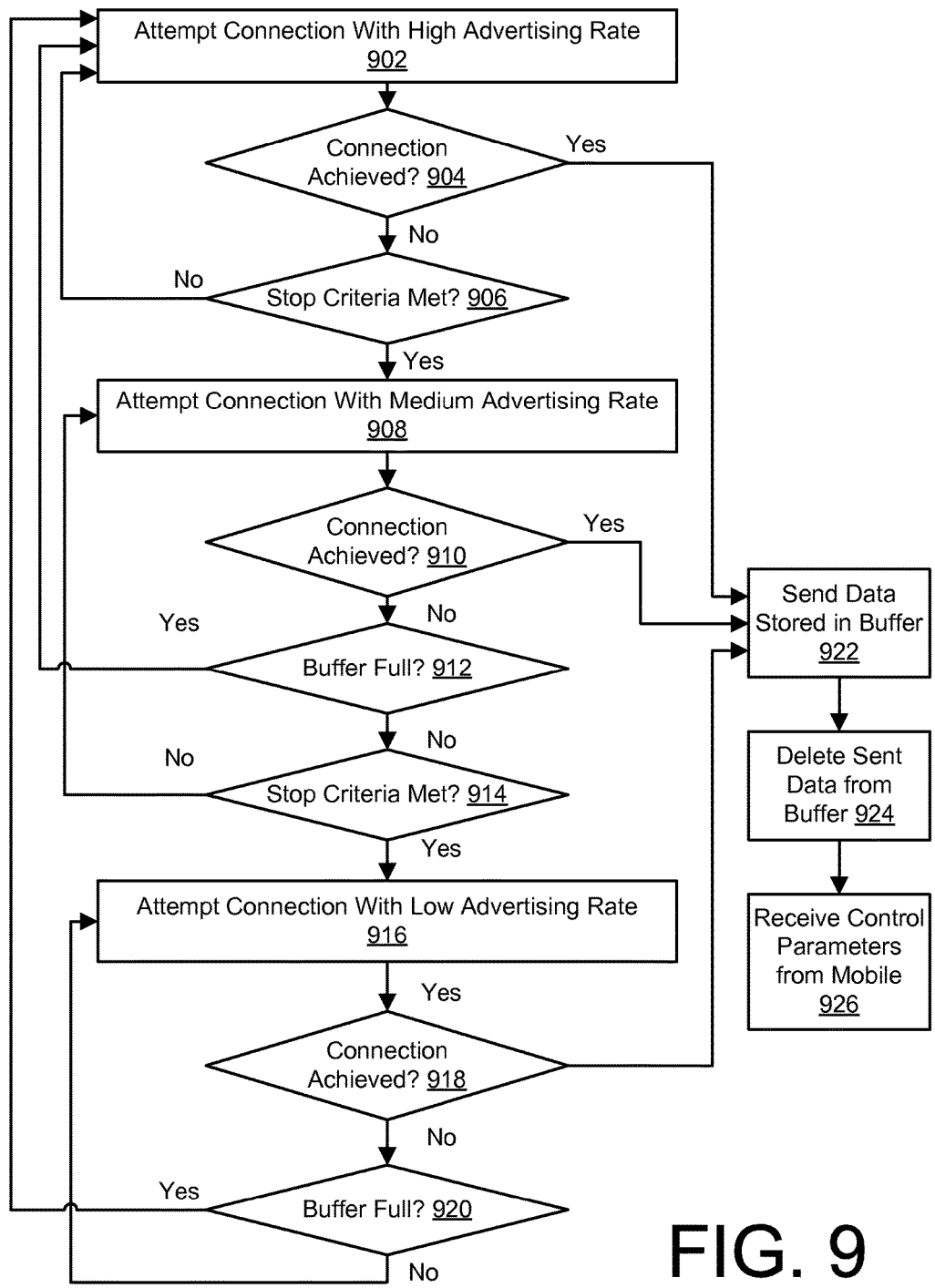
FIG. 9 is a flowchart illustrating an embodiment of a process for switching between advertising rates in a peripheral device.

FIG. 9 is a flowchart illustrating an embodiment of a process for switching between advertising rates in a peripheral device 110. When operating with a higher advertising rate, the peripheral device 110 attempts to connect to the mobile device 120 at a higher frequency than when operating with a low advertising rate, thereby enabling the peripheral device to exchange data with the mobile device 120 more quickly. However, a higher advertising rate generally consumes more power than a low advertising rate. In the process of FIG. 9, the peripheral device 110 initially attempts a connection to the mobile device 120 using a high advertising rate (e.g., on initial power up, reset, or after a connection to the mobile device 120 is lost). If a connection is achieved 904, the peripheral device 110 sends 922 data in its buffer to the mobile device 120, then deletes 924 the sent data from the buffer once transferred, and receives 926 control parameters from the mobile device 120 to control the advertising rate. For example, the process may return to either step 902, 908, or 916 of FIG. 9 depending on whether the advertising rate is set to high, medium, or low respectively. Otherwise, the peripheral device 110 determines 906 if a stopping criterion is met. If the stopping criterion is not met, the peripheral device re-attempts 902 the connection with the high advertising rate. If the stopping criterion is met, the peripheral device 110 reduces the advertising rate (e.g., to a medium advertising rate) and attempts 908 to make a connection the mobile device 120 with a medium advertising rate. This enables the peripheral device 110 to reduce its power consumption until a mobile device 120 is available for connection. In various embodiments, the stopping criterion may comprise, for example, a predefined number of connection attempts being met, a predefined time period elapsing, or receiving an external trigger event (e.g., the battery of the peripheral device dropping below a predefined threshold). If a connection is achieved 910 with the medium advertising rate, the peripheral device 110 sends 922 data in its buffer to the mobile device 120, deletes 924 the sent data from the buffer once transferred, and receives 926 control parameters from the mobile device 120 to control the advertising rate as long as the connection is maintained. Otherwise, the peripheral device 110 determines 912 if its data buffer is full. If the data buffer is full, the peripheral device 110 returns to step 902 and attempts to make a connection using the high advertising rate so that it can transfer data from the full buffer more quickly. If the buffer is not full, the peripheral device 110 determines 914 if a stopping criterion is met. If the stopping criterion is not met, the process returns to step 908 and re-attempts the connection using the medium advertising rate. If the stopping criterion is met, the peripheral device 110 reduces the advertising rate (e.g., to a low advertising rate) and attempts 916 to make a connection the mobile device 120 with a low advertising rate. If a connection is achieved 918 with the low advertising rate, the peripheral device 110 sends 922 data in its buffer to the mobile device 120, deletes 924 the sent data from the buffer once transferred, and receives 926 control parameters from the mobile device 120 to control the advertising rate as long as the connection is maintained. Otherwise, the peripheral device 110 determines 920 if its data buffer is full. If the data buffer is full, the peripheral device 110 returns to step 902 and attempts to make a connection using the high advertising rate so that it can transfer data from the full buffer more quickly. If the buffer is not full, the peripheral device 110 returns to step 916 and continues to attempt the connection using the low advertising rate.

In one embodiment, the mobile device 120 may control the peripheral device 110 to increase its advertising rate (e.g., from low to medium or from medium to high) if it detects that the peripheral device battery level is below a predefined threshold and the time since the last connection is below a predefined threshold.

Figure 10:
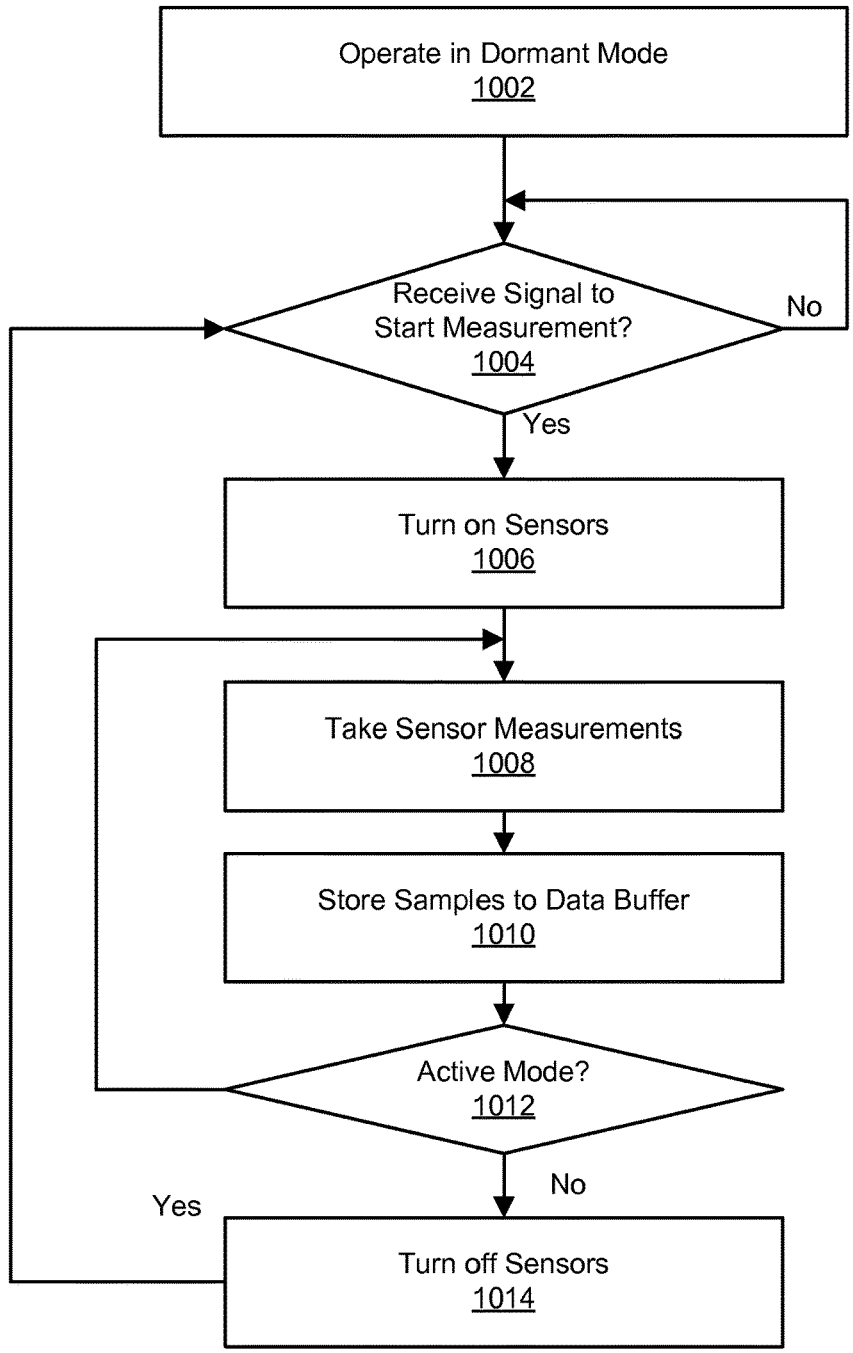
FIG. 10 is a flowchart illustrating an embodiment of a process for operating a peripheral device.

FIG. 10 illustrates an embodiment of a process for operating a peripheral device 110. The peripheral device 110 initially operates 1002 in a dormant mode in which the sensors do not take measurements. The peripheral device 110 monitors 1004 for a control signal to start taking measurements. As long as the control signal is not received, the peripheral device 110 continues to monitor 1004 for the signal. When the signal is received, the peripheral device 110 turns on 1006 the sensors and starts taking 1008 measurements. The sensor samples are stored 1010 to a data buffer of the peripheral device 110. The peripheral device 110 determines 1012 if it should continue to operate in active mode and if so, returns to step 1008 to continue taking measurements. Otherwise, the peripheral device 110 turns off the sensors 1014 to save power. For example, the peripheral device 110 may exit active mode in response to a control signal from the mobile device 120 or some other predefined criterion being met.

Figure 11:
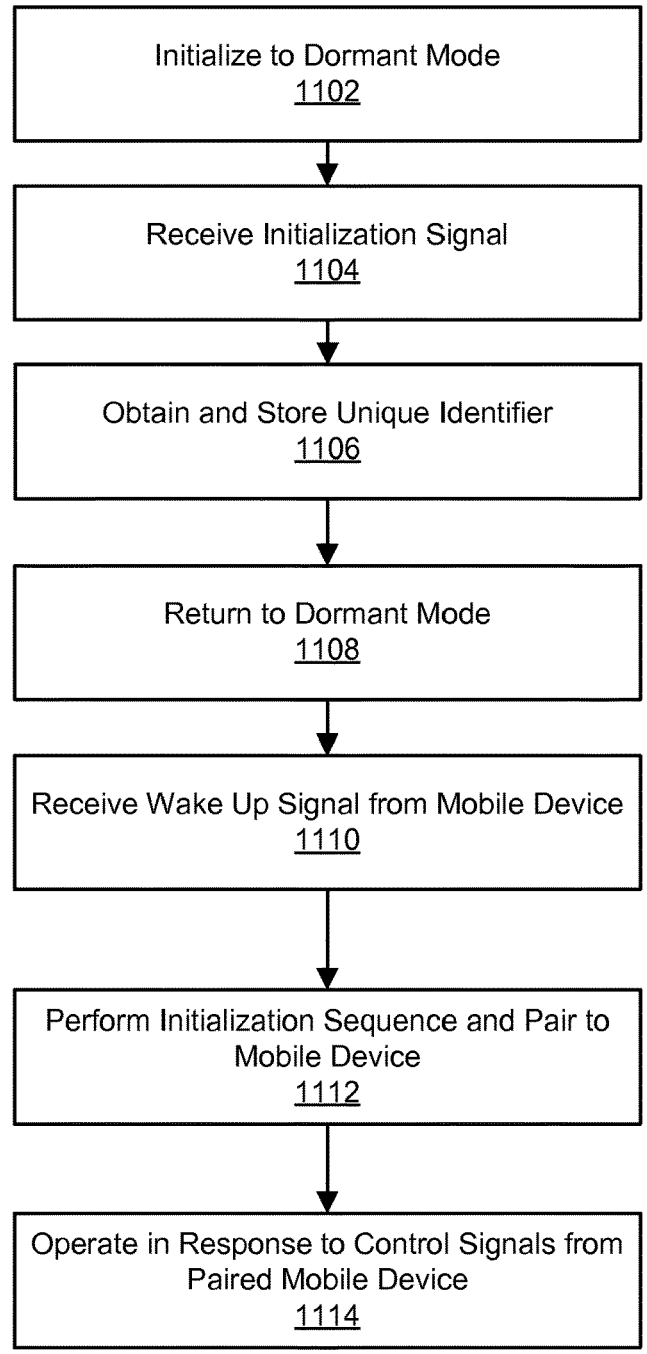
FIG. 11 is a flowchart illustrating a process for initializing a peripheral device upon initial startup.

FIG. 11 illustrates an embodiment of a process for configuring a peripheral device 110 upon initial startup or reset. Upon initial startup (for example, when first assembled at the factory), the peripheral device 110 initializes 1102 itself in the dormant mode. The peripheral device 110 remains in the dormant mode and passively listens until it receives 1104 an initialization signal. The initialization signal may be, for example, a wireless signal from a mobile device 120 or other device configured for initializing the peripheral device 110 or may comprise a signal generated from the press of a button. After receiving the initialization signal, the peripheral device 110 receives and stores 1106 a unique identifier that is used to identify the peripheral device 110 in future communications. Once the unique identifier is obtained and stored, the peripheral device 110 returns 1108 to the dormant mode. At a later time, (e.g., before its first use), the peripheral device 110 receives 1110 a wake up signal from a mobile device 120 that causes the peripheral device 110 to wake up and enter an active mode. The peripheral device 110 and the mobile device 120 then perform 1112 an initialization and pairing sequence in order to pair the mobile device 120 and the peripheral device 110. After initialization and pairing, the peripheral device 110 operates 1114 based on control parameters received from the paired mobile device 120 as described above.

In other alternative embodiments, the application 400 executes on a computing system that is not necessarily a mobile device 120 and controls a peripheral device 110 that is not necessarily a wearable or user-carried device. For example, in one embodiment, the application 400 operates on an in-vehicle computer system and controls a peripheral device 110 that is in the form of an engine control unit of a hybrid automobile equipped with an internal combustion engine and an alternate electric drive system. In this embodiment, the mode of transport engine 404 determines which mode of motive power is in operation and selects between, for example, internal combustion engine, electric drive, or both. In an example operating scenario, the user is driving using the normal internal combustion engine into a city center. Air pollution sensors detect reducing air quality levels and mode of transport, speed, and location information from the mode of transport engine 404 and location tracking engine 402 are analyzed by the state machine 410. The application 400 detects the proximity of an Ultra Low Emissions Zone and accurately predicts the journey being taken from previous learned behavior, and instructs the engine control unit to switch into an electric mode to comply with regulations.

In another example in which the application 400 executes on an in-vehicle computer system, the application 400 may communicate with roadside peripheral devices 110 integrated with, for example, traffic light systems at a road junction to actuate a relay to change priorities if the vehicle is an emergency vehicle on an emergency call or if the vehicle is operating with a zero emission drive and is given preferential priority at road junctions.

In yet other embodiments, the peripheral device 110 may be integrated with a security barrier or door lock system. In such embodiments, the application 400 activates electromechanical devices or actuators on a peripheral device 110 responsive to the location of the mobile device. For example, where the peripheral device 110 is controlling a security barrier in an access-controlled zone the location tracking engine 402 detects that the user carrying the mobile device 120 is approaching the security barrier and the mobile device 120 connects wirelessly with the peripheral device 110 and issues a passcode to the peripheral device 110 to actuate a relay to energize the security gate opening system. Such a system could also operate on security doors in a building controlling door locks in and out of controlled-access zones.

In another example, in the event of an emergency situation where emergency personnel need access to multiple locations behind secured doors, a mobile device 120 carried by the emergency personnel could connect wirelessly with a peripheral device 110 operating each door lock and instruct each peripheral device 110 to activate a solenoid to unlock each door as the emergency personnel approached.

In another example, the mobile device 120 connects wirelessly with a peripheral device 110 that is integrated with an ordnance system, so that when the ordnance system is being transported on a vehicle or carried on foot, the mobile device 120 instructs the peripheral device 110 to actuate a safety switch or otherwise enter a disarmed mode.

In another example, the mobile device 120 can determine the mode of transport of the user and connect wirelessly with a peripheral device 110 that controls access to an item of luggage, such that when the user is traveling on a plane or in a taxi to or from the airport or the mobile device 120 and peripheral device 110 are no longer in wireless range, then the item of luggage is locked from within. Only when the user is stationary and in proximity of the item of luggage does the mobile device 120 instruct the peripheral device 110 to actuate the locking mechanism to unlock the item of luggage.

In another example, the application 400 executes on a train computer system. The location tracking engine 402 monitors progress and events and compares them with the scheduled journey. In the event of an incident such as a crash, then the location tracking engine 402 would detect rapid deceleration and/or orientation changes indicating that an accident had occurred. In this situation the application 400 can communicate with multiple peripheral devices 110 located throughout the train to actuate locks to unlock or otherwise enable access to on-board emergency equipment such as torches and blankets, or to enable medical devices such as defibrillators, etc.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

Any of the steps, operations, or processes described herein may be performed or implemented with one or more hardware or software modules, alone or in combination with other devices. In one embodiment, a software module is implemented with a non-transitory computer-readable medium containing computer program instructions, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible non-transitory computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A computer-implemented method for controlling a peripheral device, the method comprising:
    determining, by a processing device, location information indicating a location of the processing apparatus;
    determining, by the processing device, mode of transport information indicating a mode of transport being used by the user carrying the processing apparatus;
    determining, by the processing device, a data collection parameter for controlling a sampling rate of data collection by the peripheral device based on the location information and the mode of transport information;
    transmitting a control signal including the data collection parameter to the peripheral device to control the peripheral device to obtain sensor data in accordance with the sampling rate;
    receiving, by the processing device from the peripheral device, the sensor data obtained by the peripheral device at the sampling rate; and
    generating, by the processing device, an output representing the sensor data.

2. The computer-implemented method of claim 1, further comprising:
    determining a current operating state of the peripheral device; and
    wherein determining the data collection parameter for controlling the sampling rate is further based on the current operating state.

3. The computer-implemented method of claim 1, further comprising:
    updating the data collection parameter of the peripheral device based on the sensor data to adjust the sampling rate of the data collection by the peripheral device.

4. A non-transitory computer-readable storage medium storing instructions for controlling a peripheral device, the instructions when executed by a processor causing the processor to perform steps including:
    determining, by a processing device, location information indicating a location of the processing apparatus;
    determining, by the processing device, mode of transport information indicating a mode of transport being used by the user carrying the processing apparatus;
    determining, by the processing device, a data collection parameter for controlling a sampling rate of data collection by the peripheral device based on the location information and the mode of transport information;
    transmitting a control signal including the data collection parameter to the peripheral device to control the peripheral device to obtain sensor data in accordance with the sampling rate;
    receiving, by the processing device from the peripheral device, the sensor data obtained by the peripheral device at the sampling rate; and generating, by the processing device, an output representing the sensor data.

5. The non-transitory computer-readable storage medium of claim 4, the instructions when executed further causing the processor to perform steps including:
    determining a current operating state of the peripheral device; and
    wherein determining the data collection parameter for controlling the sampling rate is further based on the current operating state.

6. The non-transitory computer-readable storage medium of claim 4, the instructions when executed further causing the processor to perform steps including:
    updating the data collection parameter of the peripheral device based on the sensor data to adjust the sampling rate of the data collection by the peripheral device.

7. A processing apparatus for controlling a peripheral device, the processing apparatus comprising:
    a processor; and
    a non-transitory computer-readable storage medium storing instructions, the instructions when executed by the processor causing the processor to perform steps including:
    determining, by a processing device, location information indicating a location of the processing apparatus;
    determining, by the processing device, mode of transport information indicating a mode of transport being used by the user carrying the processing apparatus;
    determining, by the processing device, a data collection parameter for controlling a sampling rate of data collection by the peripheral device based on the location information and the mode of transport information;
    transmitting a control signal including the data collection parameter to the peripheral device to control the peripheral device to obtain sensor data in accordance with the sampling rate;
    receiving, by the processing device from the peripheral device, the sensor data obtained by the peripheral device at the sampling rate; and
    generating, by the processing device, an output representing the sensor data.

8. The processing apparatus of claim 7, the instructions when executed further causing the processor to perform steps including:
    determining a current operating state of the peripheral device; and
    wherein determining the data collection parameter is further based on the current operating state.

9. The processing apparatus of claim 7, the instructions when executed further causing the processor to perform steps including:
    updating the data collection parameter of the peripheral device based on the sensor data to adjust the sampling rate of the data collection by the peripheral device.

10. The processing apparatus of claim 7, the instructions when executed further causing the processor to perform steps including:
    determining based on the location information, whether the user carrying the peripheral device is in an indoor environment, a typical outdoor environment, or a city center outdoor environment; and
    wherein determining the data collection parameter of the peripheral device is further based on the whether the user carrying the peripheral device is in the indoor environment, the typical outdoor environment, or the city center outdoor environment.

11. The processing apparatus of claim 7, wherein the data collection parameter of the peripheral device further comprises a duty cycle at which the peripheral device switches between an active state in which the peripheral device actively collects data according to the sampling rate and a dormant state in which the peripheral device does not actively collect data.

12. The processing apparatus of claim 7, the instructions when executed further causing the processor to perform steps including:
    controlling an advertising rate of the peripheral device based on the location information and the mode of transport information, the advertising rate specifying how frequently the peripheral device attempts connections to the processing device to transfer the sensor data to the processing device and receive the control parameter from the processing device.

13. The processing apparatus of claim 7, wherein the sensor data comprises at least one of: a carbon monoxide level and an ambient temperature.

14. The processing apparatus of claim 7, the instructions when executed further causing the processor to perform steps including:
    determining if a battery state of the peripheral device is below a first threshold power level;
    determining if a battery state of the processing device is above a second threshold power level; and
    activating an energy module of the processing device to output a wireless charging signal to the peripheral device responsive to the battery state of the peripheral device being below the first threshold power level and the battery state of the processing device being above the second threshold power level, the wireless charging signal to wirelessly charge a battery of the peripheral device.

15. The processing apparatus of claim 14, wherein activating the energy module comprises:
    activating a wireless scanning function of a wireless communications module of the processing device to periodically output scanning signals; and
    denying connection requests from responding neighboring devices.

16. The processing apparatus of claim 7, the instructions when executed further causing the processor to perform steps including:
    determining a control parameter for an energy module of the processing device based the location information and the mode of transport; and
    controlling the energy module to activate a wireless charging signal to the peripheral device dependent on the control parameter, the wireless charging signal to wirelessly charge a battery of the peripheral device.

17. The processing apparatus of claim 7, further comprising:
    determining if a change occurs to the mode of transport or the location;
    responsive to the change, performing a lookup in a lookup table to determine a base sampling rate indexed to the mode of transport and the location in the lookup table; and
    adjusting the base sampling rate up to an adjusted sampling rate responsive to the received sensor data indicating an air quality measure meets first criteria;
    adjusting the base sampling rate down responsive to the received sensor data indicating the air quality measure meets second criteria; and adjusting the data collection parameter to control the sampling rate of the peripheral device according to the adjusted base sampling rate.

18. The processing apparatus of claim 17, the instructions when executed further causing the processor to perform steps including:
decreasing the adjusted sampling rate responsive to receiving an indication that the peripheral battery level is below a predefined threshold.

19. The processing apparatus of claim 7, wherein the determining the mode of transport information comprises:
selecting between a static mode, an on foot mode, a bike mode, a bus mode, a car mode, and a train mode.

20. The processing apparatus of claim 7, the instructions when executed further causing the processor to perform steps including:
controlling an actuator of the peripheral device based on the location information and the mode of transport information.

* * * * *